UNITED STATES PATENT OFFICE.

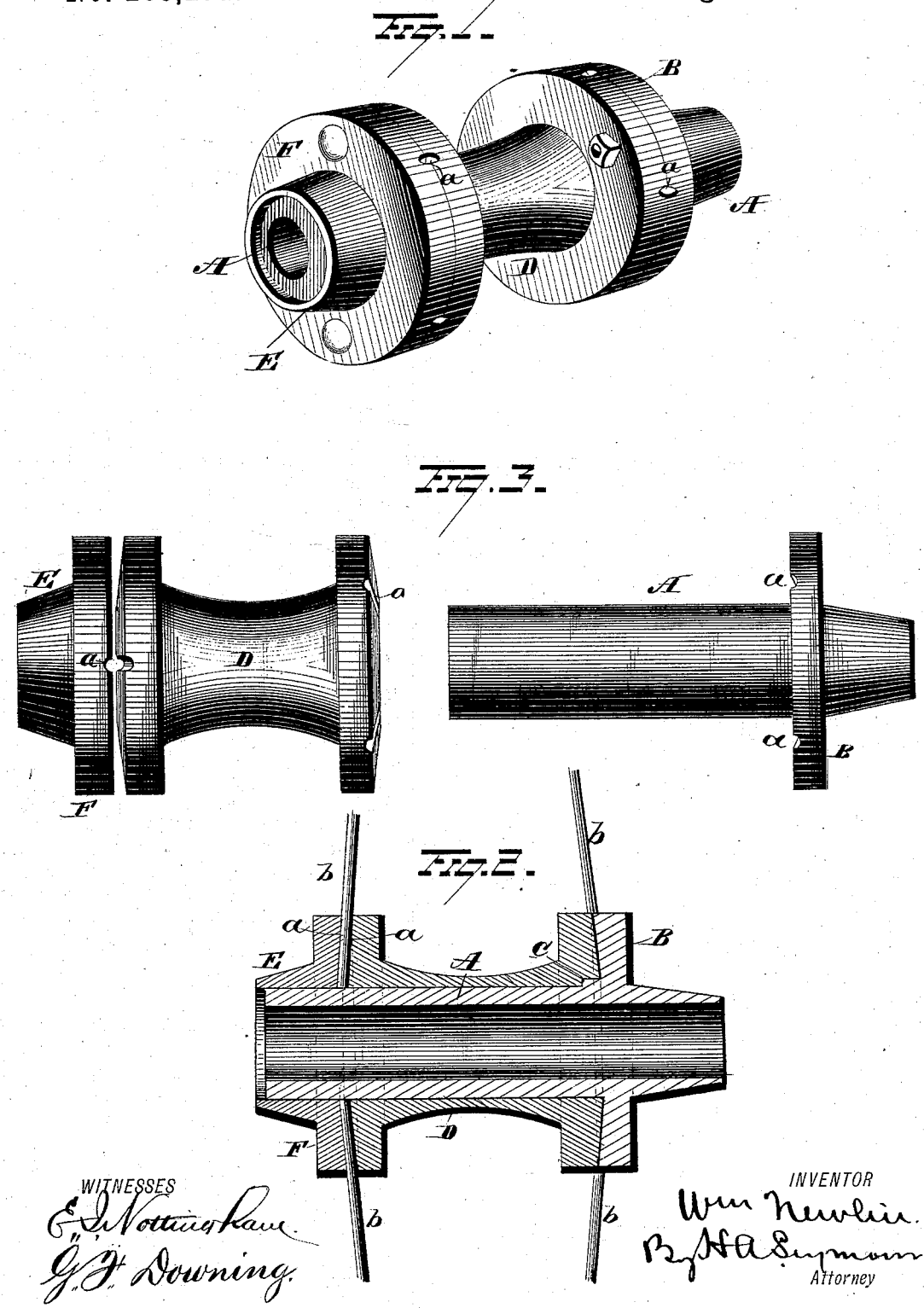

WILLIAM NEWLIN, OF ATTICA, INDIANA.

HUB.

SPECIFICATION forming part of Letters Patent No. 283,271, dated August 14, 1883.

Application filed May 28, 1883. (No model.)

*To all whom it may concern:*

Be it known that I, WILLIAM NEWLIN, of Attica, in the county of Fountain and State of Indiana, have invented certain new and useful Improvements in Hubs; and I do hereby declare the following to be a full, clear, and exact description of the invention, such as will enable others skilled in the art to which it appertains to make and use the same.

My invention relates to an improvement in metallic hubs for vehicles, the object being to provide a device of this character which shall combine simplicity and economy of construction with durability and efficiency in use; and with these ends in view my invention consists in certain details of construction and combinations of parts, as will be hereinafter described, and pointed out in the claims.

In the accompanying drawings, Figure 1 is a view in perspective of my improvement. Fig. 2 is a view thereof in section. Fig. 3 is a detached view of the several parts.

A represents the axle-box, provided with a flange, B, and fillet C. On this box is adapted to fit the spool D, the flanges on each end thereof corresponding to each other. This spool is provided with a groove, in which is adapted to fit the fillet C on the axle-box A, which prevents the spool from revolving on the said axle-box.

E represents a sleeve provided with the flange F, which corresponds in general contour with the flange B and those on the spool D. This sleeve is adapted to fit on the axle-box A, the flange F thereof resting flush with one flange on the spool, the other flange of the latter fitting flush against the flange B on the axle-box. The corresponding faces of these several flanges are each provided with half-sockets $a$, registering with each other, in which are adapted to fit the spokes $b$, the ends of the latter being firmly seated on the axle-box A. The said sockets $a$ are preferably constructed on an incline, thus allowing the spokes to form a straight line from the tire to the axle-box. These flanges are bolted or otherwise rigidly secured, as shown in the drawings.

Having fully described my invention, what I claim as new, and desire to secure by Letters Patent, is—

A hub consisting of the axle-box A, provided with a flange, B, having radial spoke-slots $a$ on its inner face, and a spline, $c$, a spool or hub-section, D, provided with a groove for the reception of the spline $c$, and constructed with end flanges, having radial spoke-slots $a$ on the outer surface of its flanges, a separate flange or hub-section, E, fitted on the end of the axle-box, and provided with radial slots on its inner face, and bolts extending through said flanges for securing the parts together, substantially as set forth.

In testimony whereof I have signed this specification in the presence of two subscribing witnesses.

WILLIAM NEWLIN.

Witnesses:
FRED P. COOKE,
ALBERT D. LEMON.